US009457680B2

(12) United States Patent
Shinzaki et al.

(10) Patent No.: US 9,457,680 B2
(45) Date of Patent: Oct. 4, 2016

(54) VEHICLE-TO-GRID CONTROL

(71) Applicant: Honda Motor Co., Ltd., Tokyo (JP)

(72) Inventors: Satoru Shinzaki, Torrance, CA (US); Toshiharu Kumagai, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 341 days.

(21) Appl. No.: 14/214,318

(22) Filed: Mar. 14, 2014

(65) Prior Publication Data

US 2015/0137752 A1    May 21, 2015

Related U.S. Application Data

(60) Provisional application No. 61/904,458, filed on Nov. 15, 2013.

(51) Int. Cl.
*B60L 11/18* (2006.01)

(52) U.S. Cl.
CPC ........ *B60L 11/1842* (2013.01); *B60L 11/1844* (2013.01); *B60L 11/1848* (2013.01); *Y02B 70/3225* (2013.01); *Y02T 10/7005* (2013.01); *Y02T 10/92* (2013.01); *Y02T 90/16* (2013.01); *Y02T 90/163* (2013.01); *Y02T 90/168* (2013.01); *Y02T 90/169* (2013.01); *Y04S 20/222* (2013.01); *Y04S 30/12* (2013.01); *Y04S 30/14* (2013.01)

(58) Field of Classification Search
CPC .................................................. B60L 11/1842
USPC ....................................................... 320/109
See application file for complete search history.

(56) References Cited

U.S. PATENT DOCUMENTS

| | | | |
|---|---|---|---|
| 5,642,270 A | 6/1997 | Green et al. | |
| 7,782,021 B2 | 8/2010 | Kelty et al. | |
| 8,314,587 B2 | 11/2012 | White et al. | |
| 8,319,358 B2 | 11/2012 | Curry et al. | |
| 2010/0274656 A1 | 10/2010 | Genschel et al. | |
| 2011/0047102 A1 | 2/2011 | Grider et al. | |
| 2011/0196692 A1 | 8/2011 | Chavez, Jr. et al. | |
| 2011/0202418 A1 | 8/2011 | Kempton et al. | |
| 2012/0161702 A1 | 6/2012 | Kim | |
| 2012/0206104 A1 | 8/2012 | Tsuchiya | |
| 2013/0002188 A1 | 1/2013 | Uyeki | |
| 2013/0179061 A1 | 7/2013 | Gadh et al. | |
| 2013/0204443 A1 | 8/2013 | Steven et al. | |
| 2013/0241485 A1* | 9/2013 | Snyder | B60W 20/11 320/109 |

FOREIGN PATENT DOCUMENTS

JP    2001008380 A    1/2001

* cited by examiner

*Primary Examiner* — Thuan Do
(74) *Attorney, Agent, or Firm* — Arent Fox LLP

(57) ABSTRACT

There is provided a system and a computer-implemented method for storing electrical charge in an electric vehicle connected to a charging station. The method includes: attaining a minimum State of Charge (SOC) for the electric vehicle; determining a time to charge the electric vehicle to a maximum SOC; maintaining an electric vehicle SOC by repeatedly charging and allowing discharge of the electric vehicle between the minimum SOC and a threshold; and charging the electric vehicle to the maximum SOC when the determined time to charge the electric vehicle to a maximum SOC has elapsed, wherein the threshold is greater than the minimum SOC and the maximum SOC is greater than or equal to the threshold.

20 Claims, 8 Drawing Sheets

VEHICLE-TO-GRID CONTROL

CROSS-REFERENCE TO RELATED APPLICATION

This application claims priority from and the benefit under 35 U.S.C. §119(e) of U.S. Provisional Application No. 61/904,458 filed Nov. 15, 2013, which is hereby incorporated by reference in its entirety for all purposes as if fully set forth herein.

BACKGROUND

1. Field

The present application generally relates to improving electric grid stabilization by utilizing an electric vehicle (EV) battery to store excess electric grid capacity. A method and a system for storing excess electric grid capacity are disclosed.

2. Description of the Background

When the charging of an electric vehicle (EV) is initiated and a State of Charge (SOC) is greater than a minimum SOC, the charging of the EV is halted. FIG. 1 illustrates typical prior art behavior of a State of Charge (SOC) of an electric vehicle (EV) when being charged. In the prior art, a high EV minimum SOC 102 of 95% is set close to a maximum SOC 104 of 100% in a Vehicle-to-Grid (V2G) mode. With the high EV minimum SOC 102, an operational window 112 for storing a charge is very narrow or only 5% of charge capacity. When the grid requests that the EV store electric energy, the EV's SOC reaches or exceeds the maximum SOC quickly. When the SOC in the EV reaches or exceeds the maximum SOC, the EV charging is halted and the EV may not be utilized to store electrical energy on behalf of the electrical grid or utility. In other words, when the V2G maintains the EV at a high minimum SOC 102, the SOC easily hits a peak SOC 104 (for example, 100%). Moreover, in order to maintain the EV's SOC above the minimum SOC, the high minimum SOC and the narrow operational window 112 require the EV to recharge frequently. As such, the EV's opportunities to take advantage of a more optimal time to charge to the maximum SOC 104 are reduced.

SUMMARY

It is to be understood that both the foregoing general description and the following detailed description are exemplary and explanatory and are intended to provide further explanation of the disclosure as claimed.

According to exemplary embodiments, there is provided a computer-implemented method for storing electrical charge in an electric vehicle connected to a charging station. The method includes: attaining a minimum State of Charge (SOC) for the electric vehicle; determining a time to charge the electric vehicle to a maximum SOC; maintaining an electric vehicle SOC by repeatedly charging and allowing discharge of the electric vehicle between the minimum SOC and a threshold; and charging the electric vehicle to the maximum SOC when the determined time to charge the electric vehicle to a maximum SOC has elapsed, wherein the threshold is greater than the minimum SOC and the maximum SOC is greater than or equal to the threshold.

According to exemplary embodiments, there is provided a vehicle system for storing electrical charge in an electric vehicle connected to a charging station. The system including: a telematics-navigation device configured to identify information of electric energy provided by the charging station; and a control unit configured to attain a minimum State of Charge (SOC) for the electric vehicle; determining a time to charge the electric vehicle to a maximum SOC; maintaining an electric vehicle SOC by repeatedly charging and allowing discharge of the electric vehicle between the minimum SOC and a threshold; and charging the electric vehicle to the maximum SOC when the determined time to charge the electric vehicle to a maximum SOC has elapsed, wherein the threshold is greater than the minimum SOC and the maximum SOC is greater than or equal to the threshold.

Additional features of the invention will be set forth in the description that follows, and in part will be apparent from the description, or may be learned by practice of the invention.

BRIEF DESCRIPTION OF THE DRAWINGS

The accompanying drawings, which are included to provide a further understanding of the disclosure and are incorporated in and constitute a part of this specification, illustrate embodiments of the disclosure, and together with the description serve to explain the principles of the disclosure. When dataflow diagram is in abstract representation of information flowing in and out of the system and from place to place within the system, where it may be operated upon by different elements of the system. Different elements may be operated on by modules or processes within the system, and data from these modules may flow to another module.

DESCRIPTION

Figure 1:
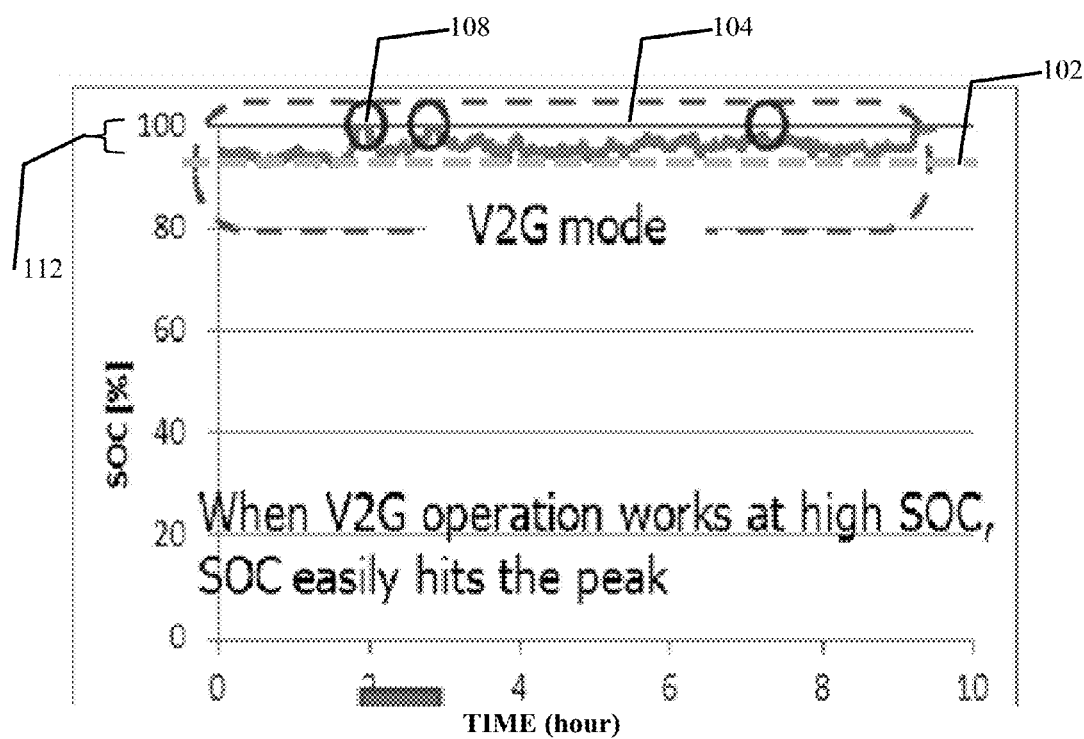
FIG. 1 illustrates typical prior art behavior of a State of Charge (SOC) of an electric vehicle (EV) when being charged.

The disclosure is described more fully hereinafter with reference to the accompanying drawings, in which exemplary embodiments of the disclosure are shown. This disclosure may, however, be embodied in many different forms and should not be construed as limited to the embodiments set forth herein. Rather, these exemplary embodiments are provided so that this disclosure is thorough, and will fully convey the scope of the disclosure to those skilled in the art. It will be understood that for the purposes of this disclosure, "at least one of X, Y, and Z" may be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

An embodiment is now described with reference to the figures. In the figures like reference numbers indicate identical or functionally similar elements. Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are used by those skilled in the data processing arts to most convey the substance of their work to others skilled in the art. Here, and generally, an algorithm is conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. The process steps and instructions of the embodiments may be embodied in software, firmware or hardware, and when embodied in software, may be downloaded to reside on and be operated from different platforms used by a variety of operating systems.

The embodiments also relate to an apparatus for performing the operations herein. This apparatus may be specially constructed for the required purposes, or it may be a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the embodiments, and any references below to specific languages are provided for enablement and best mode of the embodiments.

In addition, the language used in the specification has been principally selected for readability and instructional purposes, and may not have been selected to delineate or circumscribe the inventive subject matter. Accordingly, the embodiments are intended to be illustrative, but not limiting, of the scope of the embodiments, which is set forth in the claims.

Figure 2:
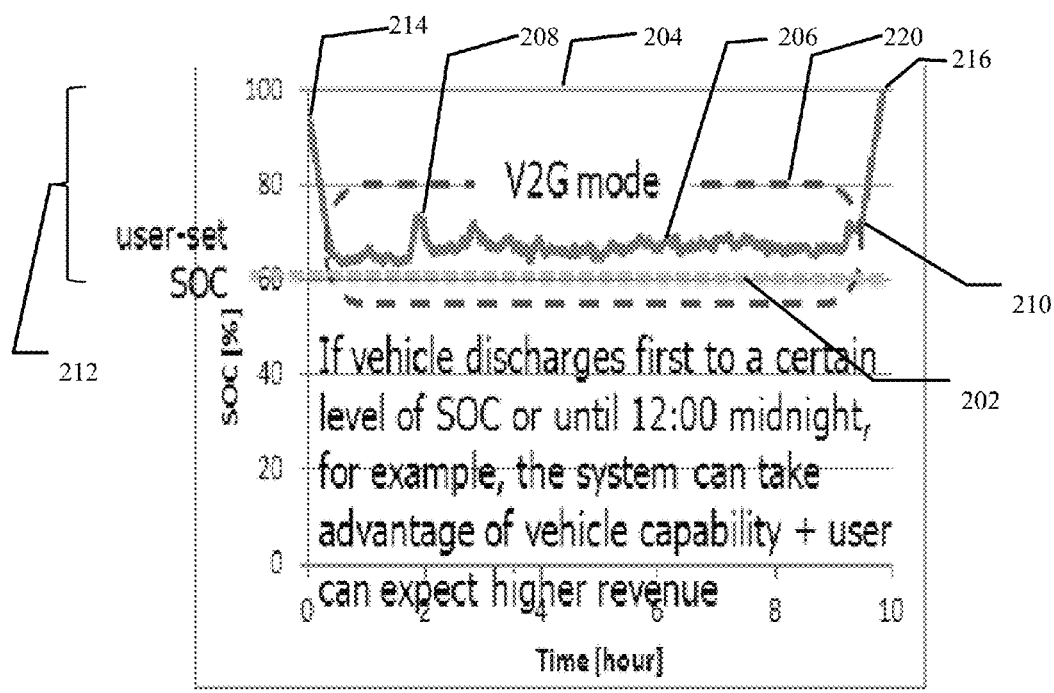
FIG. 2 illustrates a representative charging and discharging behavior of an EV in accordance with one embodiment of the present application.

FIG. 2 illustrates a representative charging and discharging behavior of an EV in accordance with one embodiment of the present application. Chart 200 illustrates an exemplary charging cycle for an EV, when the EV is being charged using, for example, a Vehicle-to-Grid (V2G) mode. Per exemplary FIG. 2, the EV can have a charge level 214 (around 95%) at hour 0. When the EV is connected to a charger with a charge level 214 of around 95%, the EV can discharge to a minimum level of SOC, for example, by discharging or providing power to the electrical grid it is connected to a minimum level of SOC 202. Alternatively, the EV is connected to a charger at hour 0 may have a SOC lower than the minimum level of SOC 202 and is charged by the charger until the SOC of the EV is greater than or equal to the minimum SOC 202.

An EV may discharge even when not being driven due to demands of various components of the EV, for example, the clock and the like. The EV charges and discharges in small increments once the EV's SOC exceeds the minimum level of SOC. The small incremental charging and discharging may be reflected by the small rapid variations in the amplitude by a waveform arising from fluctuations in the state of charge or jitters 206 as illustrated in FIG. 2.

The EV may have a maximum level of SOC, for example, 100%, 95%, 90%, or the like. A grid aggregator may utilize the capacity of the EV to store energy excesses 208 over an operational window 212. The operational window 212 may be referred to as a float or range. In exemplary embodiments, the operational window 212 includes the EV charge storing capacity between the minimum SOC and the threshold. When the grid power supply is excessive, the frequency of the Alternating Current (AC) of the current being supplied by the grid may go up and the grid becomes unstable. As such, the grid supplier may shed (discharge) or store the excess energy. By storing the excess energy in the EV, energy waste may be minimized.

In exemplary embodiments, the minimum SOC 202 is lowered, for example, to 60% as compared to the prior art minimum SOC of 95%. The lowered minimum SOC 202 may provide a larger operational window 212 between the maximum SOC 204 and the minimum SOC 202. The larger operational window 212 may allow a grid aggregator to use the EV capability to store energy excesses 208 for longer periods. In exemplary embodiments, the operational window 212 may encompass the whole range between the minimum SOC 202 and the maximum SOC 204. In exemplary embodiments, the operational window 212 may encompass some of the range between the minimum SOC 202 and the maximum SOC 204, for example, the operational window 212 may be 20%—between the minimum SOC 202 of 60% and a threshold 220 less than the maximum SOC 204 of 100%—wherein the threshold 220 for the operational window 212 is set at 80% of SOC.

The SOC within the operational window 212 may be used for or contribute to grid stabilization by providing opportunities to store energy excesses 208 from the grid. The operational window 212 may absorb excess charges from the grid to stabilize the grid, i.e., when grid capacity exceeds the minimum level of SOC 202.

The minimum SOC 202 may be set to an amount required to travel in case of certain conditions, for example, if the user has to drive to a hospital for an emergency or to travel to/from local stores. Different minimal SOC levels may be used depending on situations in which the driver would be driving outside their "normal" conditions.

The minimum level of the SOC 202 of an EV may be determined by the vehicle, the vehicle user, the aggregator, or a combination. The maximum level of SOC 204 of an EV may be determined by the vehicle, the vehicle user, the aggregator, or a combination. The vehicle owner may get revenue by allowing the vehicle to be used for energy storage.

In exemplary embodiments, a lower minimum SOC 202 provides for discharging an EV to the lower minimum SOC 202, for example, 60%, then a conventional higher minimum SOC (see, FIG. 1 illustrating a minimum SOC of 95% as noted above) at least until a predetermined time of day, for example, midnight. By lowering the minimum SOC to which a vehicle is allowed to discharge while at rest, the V2G system is afforded a larger charging window. For example, as shown above, the EV is afforded a larger operating window when the minimum SOC 202 is set to, for example, 60%, and the maximum SOC 204 is set to, for example, 80%. As such, the EV operates with a 20% operational window rather than the 5% operational window (see, FIG. 1) when the minimum SOC is 95%, the maximum SOC is 100%, and the operation window is merely 5%. With a larger operational window, the EV needs to charge less frequently. When the frequency of charging is reduced the EV may be charged at more optimal times, for example, when the utility costs to the EV user are lower, when a black/brownout is neither imminent nor in effect, or the like.

By initiating charging of the vehicle when hitting the minimum SOC up to an upper value of SOC set by the operational window 212, for example, 20% above the minimum SOC 202 as illustrated FIG. 2, reduces the frequency of charging cycles undertaken to keep the EV SOC above the minimum SOC 202. When a predetermined time 210 to charge the EV to a maximum SOC 204 arrives, the EV charges until the maximum SOC 204 is achieved at time 216.

Figure 3:
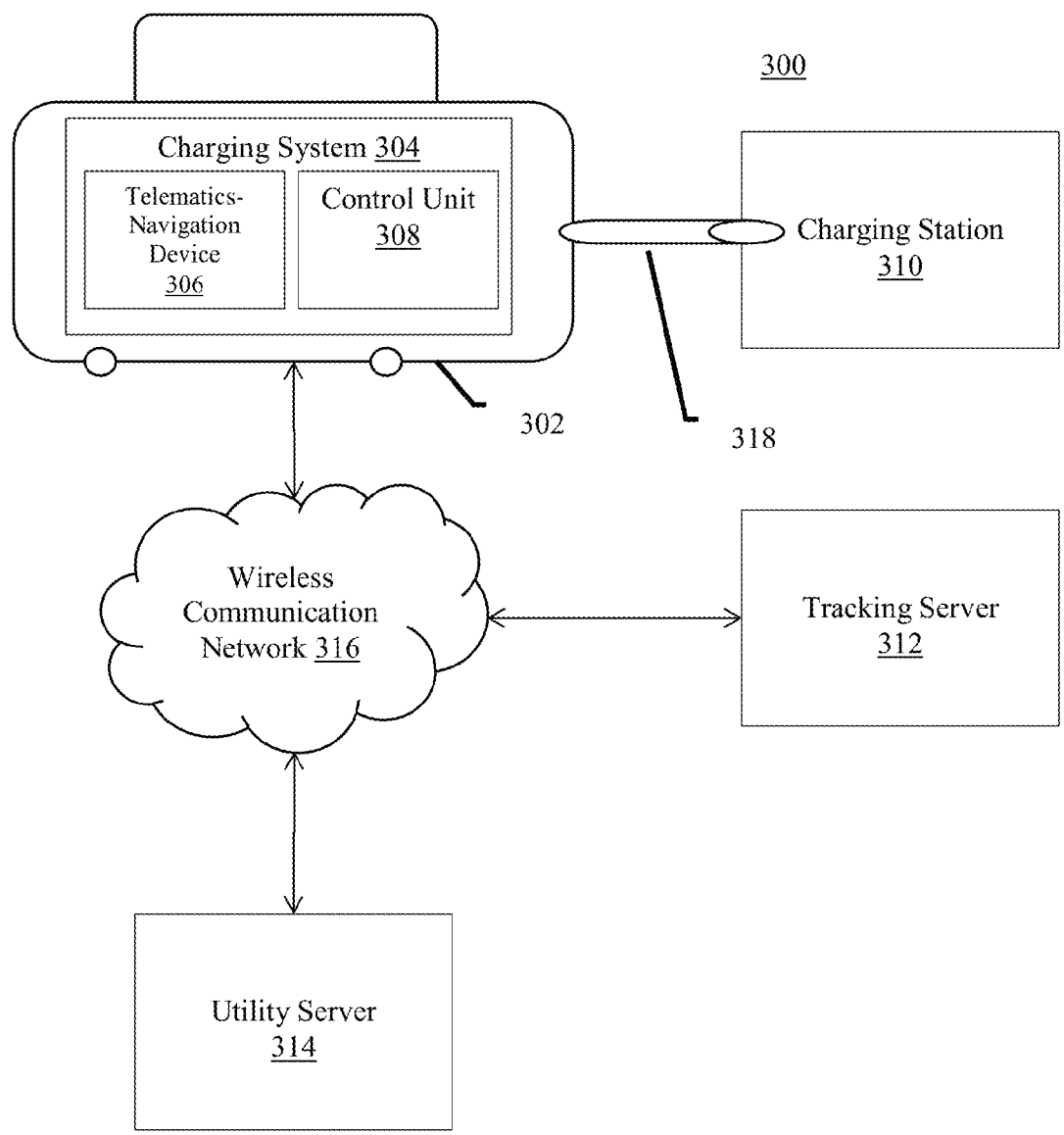
FIG. 3 illustrates a typical vehicle communication environment in accordance with one embodiment of the present application.

FIG. 3 illustrates a typical vehicle communication environment in accordance with one embodiment of the present application. FIG. 3 illustrates a vehicle communication environment 300 including an electric vehicle (EV) 302, a tracking server 312, and a utility server 314 connected by a wireless communication network 316.

The EV 302 includes an electric motor (not shown) for propulsion of the vehicle 302. In exemplary embodiments, the EV 302 may be propelled by one or more electric motors. In exemplary embodiments, the EV 302 may be propelled by one or more electric motors and another engine, for example, an internal combustion engine or a plug-in hybrid electric vehicle.

The one or more electric motors of the EV 302 may be powered by rechargeable batteries (not shown) on-board the vehicle 302. The on-board batteries may be charged when the EV 302 is connected or coupled to a charging station. In exemplary embodiments, the EV 302 may be connected to a charging station 310 via a charging cable 318. In exemplary embodiments, the EV 302 may be charged wirelessly, for example, by disposing the EV 302 proximate or adjacent to the charging station 310. The charging station 310 provides electric energy to the EV 302, for example, by charging or recharging the batteries of the EV. The electric energy may be supplied to the charging station 310 by a utility company through an electrical grid. In exemplary embodiments, the charging station 310 may be connected to a 110/120 volt circuit, a 220/240 volt circuit, or a higher voltage circuit. In exemplary embodiments, the charging station 310 may be located at a home of the EV's owner. In exemplary embodiments, the charging station 310 may be a public location, for example, a workplace, a shopping center, a charging service, or the like. In exemplary embodiments, the on-board batteries may be charged using regenerative braking.

The EV 302 includes a charging system 304 that manages the charging of the EV 302. The charging system 304 includes a telematics-navigation device 306 and a control unit 308. The telematics-navigation device 306 may exchange information with users of the telematics-navigation device 306 and entities connected to the wireless communication network 316. The telematics-navigation device 306 may receive charging instructions from a user when the EV 302 is connected to a charging station. There may be multiples modes or strategies for charging the EV 302. The telematics-navigation device 306 may communicate with the utility server 314 to obtain information on electric energy, such as, the cost of the electric energy, whether the energy was generated using a renewable energy source (e.g., sunlight, wind or tides), and the like. When the EV 302 is being charged, the telematics-navigation device 306 may provide charging information to the tracking server 312.

The control unit 308 controls the charging of the EV 302. Charging the EV 302 includes the charging of the EV's rechargeable batteries. When the EV 302 is connected to a charging station, the control unit 308 determines a strategy for charging the EV 302 based on a charging mode selected by a user. The control until 308 charges the EV according to the determined strategy.

In exemplary embodiments, a user may select an "economic" charging mode. In the economic mode, the control unit 308 may initiate the charging of the EV 302 by allowing electric energy to flow to the EV 302 from the charging station. The control unit 308 may initiate the charging regardless of the current cost of electric energy. The control unit 308 may allow the EV 302 to charge until the state of charge of the EV 302 reaches a minimum state of charge. As used herein, the term "state of charge" refers to the amount of electric charge/energy stored in the EV's batteries. Once the minimum state of charge is reached, the control unit 308 halts the charging of the EV 302 by stopping the flow of electric energy from the charging station to the EV 302. The control unit 308 may reinitiate the charging of the EV 302 when the cost of electric energy is economical, such as, during off-peak times.

The minimum state of charge may be determined by the user or may be determined by the control unit 308 based, for example, on a usage pattern. The minimum state of charge may be set such that it is enough, for example, to go to a nearby grocery store, run an errand or the like, and return home. One benefit of the economic mode is that it allows the EV 302 to receive some charge to prevent a driver from being stranded while at the same time allowing most of the charging to occur when electric energy is economical.

In exemplary embodiments, a user may select a "green" charging mode. Green mode is similar to economic mode except that the control unit 308 reinitiates the charging of the EV 302 when electric energy provided to the charging station is being generated using a renewable energy source.

The utility server 314 provides information about electric energy to different entities. In exemplary embodiments, upon request from the EV 302, the utility server 314 transmits to the EV 302 identifying information about electric energy supplied by a utility company. In exemplary embodiments, information transmitted by the utility server 314 to the EV 302 upon request includes rate information, such as, time periods when the electric energy provided by the utility company at off-peak costs, generated by a renewable source and the like.

In exemplary embodiments, information transmitted to the EV 302 includes cost information for the electric energy. In exemplary embodiments, the cost information is Time of Use (TOU) rates where the rates for electric energy vary based on time, day, month, and/or season. For example, the cost information for electric energy during summer months may be $0.14 per KWh during peak hours (e.g., 12 PM to 7 PM), $0.07 per KWh during part-peak hours (e.g., 10 AM to 12 PM and 7 PM to 10 PM), and $0.03 per KWh during non-peak hours (e.g., 12:00 AM to 10 AM and 10 PM to 11:59 PM).

In exemplary embodiments, the utility company offers special rates to the owner of the EV 302 for owning an EV and/or for allowing the tracking server 312 to control the EV's charging. Therefore, in this embodiment, a request from the EV 302 received by the utility server 314 includes identifying information of the EV 302 (e.g., vehicle identification number (VIN) of the EV 302) and/or identifying information of the owner (e.g., owner's name or address) so that the utility server 314 provides accurate cost information to the EV 302.

In exemplary embodiments, the utility server 314 receives requests from the tracking server 312 for total electric energy storage capacity of sectors. For a requested sector, the utility server 314 transmits to the tracking server 312 the current total electric energy storage capacity of the sector. The total electric energy storage capacity of a sector includes the total electric energy storage available from the EVs in the sector. Entities may include charging stations, homes, and businesses. In exemplary embodiments, the utility server 314 also transmits information on the total electric energy consumption and/or storage capacity of a sector to the EV 302.

In exemplary embodiments, the utility server 314 is maintained by a utility company. In exemplary embodiments, the utility server 314 is maintained by a third-party that obtains information from one or more utility companies.

The wireless communication network 316 represents a communication pathway between the EV 302, the tracking server 312, and the utility server 314. In exemplary embodiments, the wireless communication network 316 is a cellular network including multiple base stations, controllers, and a core network including multiple switching entities and gateways. In exemplary embodiments, the wireless communication network 316 is a Wireless Local Area Network (WLAN) that provides wireless communication over a limited area. In exemplary embodiments, the WLAN includes an access point that connects the WLAN to the Internet.

A telematics-navigation device 306 includes a processor 402, an input device 404, an output device 406, a transceiver device 408, a position detection device 410, and a memory 412.

Figure 4:
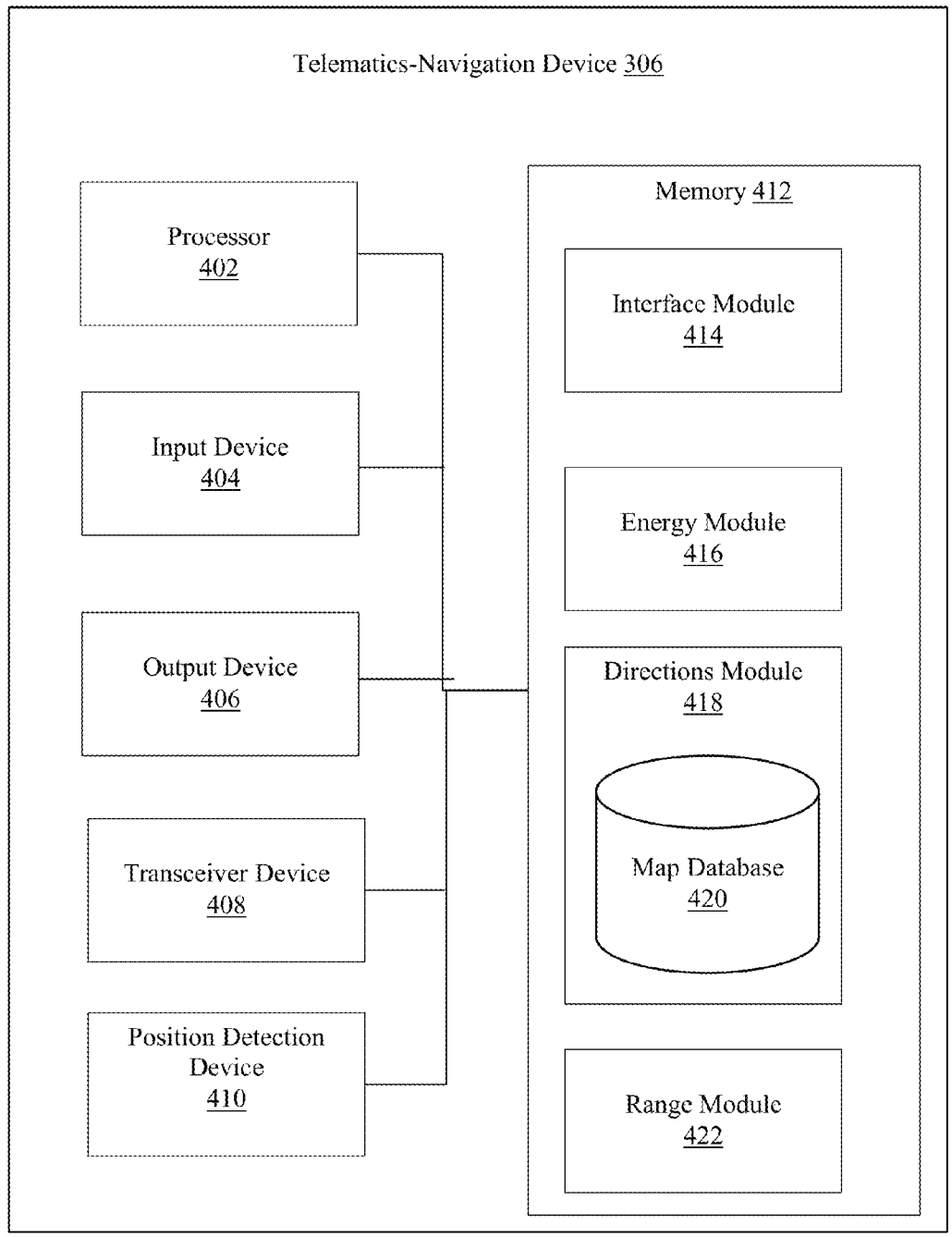
FIG. 4 illustrates a typical telematics-navigation device in accordance with one embodiment of the present application.

The processor 402 processes data signals and includes various computing architectures including a complex instruction set computer (CISC) architecture, a reduced instruction set computer (RISC) architecture, or an architecture implementing a combination of instruction sets. Although only a single processor is illustrated in FIG. 4, multiple processors may be included. The processor 402 includes an arithmetic logic unit, a microprocessor, a general purpose computer, or some other information appliance equipped to transmit, receive and process electronic data signals from the memory 412, the input device 404, the output device 406, the transceiver device 408, or the position detection device 410.

The input device 404 is configured and arranged to provide user input to the telematics-navigation device 306. Exemplary input device 404 may include a cursor controller, a keyboard, a touchscreen device, a microphone, a haptic feedback device, or the like. In exemplary embodiments, the input device 404 may include an alphanumeric input device, such as, a QWERTY keyboard, a key pad or representations of such created on a touch screen, configured and arranged to communicate information and/or command selections to processor 402 or memory 412. In exemplary embodiments, the input device 404 may include a user input device to communicate positional data and/or command selections to processor 402. The input device 404 may include a joystick, a mouse, a trackball, a stylus, a pen, a touch screen, cursor direction keys or the like to cause movement adjustment of an image.

The output device 406 includes a device configured and arranged to display electronic images and data as described herein. Output device 406 may include, for example, an organic light emitting diode display (OLED), liquid crystal display (LCD), cathode ray tube (CRT) display, or the like. In exemplary embodiments, output device 406 may include a touch-sensitive touch screen including a transparent panel cover disposed over or integrated with the screen of output device 406. In exemplary embodiments, the output device 406 includes a speaker that outputs audio as described herein.

The transceiver device 408 includes a device configured and arranged to communicate with entities connected to the wireless communication network 316. In exemplary embodiments, the telematics-navigation device 306 uses the transceiver device 408 to communicate with remote systems or devices, such as, the tracking server 312 and the utility server 314.

The position detection device 410 includes a device configured and arranged to communicate with a positioning satellite (e.g., global positioning system (GPS) satellites) to determine a geographical location of the EV 302. In exemplary embodiments, the position detection device 410 searches for and collects GPS information or signals from three, four or more GPS satellites to determine the location of the EV 302. Using the time interval between the broadcast time and reception time of each signal, the position detection device 410 may calculate the distance between the EV 302 and each of the GPS satellites. These distance measurements, along with the position and time information received in the signals, allow the position detection device 410 to calculate or determine the geographical location and/or attitude of the EV 302.

The memory 412 stores instructions and/or data that may be executed by processor 402. The instructions and/or data may code for performing any and/or all of the techniques described herein. Memory 412 may be a Dynamic Random Access Memory (DRAM) device, a Static Random Access Memory (SRAM) device, Flash RAM (non-volatile storage), combinations of the above, or some other memory device known in the art. The memory 412 may store an interface module 414, an energy module 416, a directions module 418, and a range module 422. The modules may communicate with the processor 402, the input device 404, the output device 406, the transceiver 408, and/or the position detection device 410.

The interface module 414 communicates with users of the telematics-navigation device 306. The interface module 414 receives from a user (e.g., a driver or passenger of the EV 302) a selection of a mode for charging the EV 302 when the EV 302 is connected to a charging station. The modes that a user may select from may include one or more of the following: "charge now" mode, "timer" mode, "economical" mode, and "green" mode.

Under charge now mode, the EV 302 begins to charge immediately once it is connected to a charging station and continues to charge until the EV 302 is fully charged. Under timer mode, the user provides the interface module 414 with a time to begin charging. At the time provided, the EV 302 begins to charge.

Under economical mode, as discussed above, the EV is charged to a minimum state of charge. Once the minimum state of charge is reached, the charging is halted. In exemplary embodiments, the minimum state of charge may be set by the manufacturer of the EV 302 (e.g., 10 percent, 20 percent, enough to drive for 10 miles, 20 miles, 30 miles, 60 miles etc.). In exemplary embodiments, a user provides or sets the interface module 414 with the minimum state of charge. The charging is resumed when electric energy is economical. In exemplary embodiments, economical is when the cost of energy is below peak hour cost (e.g., cost during part-peak and off-peak hours). Peak hours are when there is the highest demand for electric energy on an electrical grid. In exemplary embodiments, economical is the cost of energy during off-peak hours. In exemplary embodiments, a user provides or sets the interface module 414 with a price range for what is considered economical.

Under green mode, the EV 302 is charged to a minimum state of charge and the charging is then halted. The charging is resumed when electric energy supplied to the charging station is generated using a renewable energy source.

In exemplary embodiments, the interface module 414 communicates with a user via the input device 404 and output device 406. In exemplary embodiments, the interface module 414 may communicate and in with a user via a mobile device of the user to the wireless communication network 316. For example, the mobile device may include an application that allows the user to select the charge mode and provide settings for each mode. The mobile device transmits to the interface module 414 the user's selections and settings.

The energy module 416 obtains information on electric energy from the utility server 314. In exemplary embodiments, the information that the energy module 416 obtains from the utility server 314 includes cost information for electric energy, times when electric energy is generated using a renewable energy source, information on the total electric energy consumption of one or more sectors, or information on the total electric energy storage capacity of one or more sectors. In exemplary embodiments, the cost information obtained by the energy module includes current time of use rates for electric energy.

In exemplary embodiments, the energy module 416 periodically requests electric energy information from the utility server 314. For example, information may be requested every day, once a month, or once per calendar season. In exemplary embodiments, the energy module 416 requests electric energy information from the utility server 314 every time the EV 302 is connected to a charging station. When the energy module 416 receives electric energy information from the utility server 314, the energy module 416 may provide the information to the control unit 308.

The directions module 418 provides a user of the EV 302 with driving directions to a destination. When a request is received from a user for directions to a destination, the directions module 418 obtains the current geographic location of the EV 302 from the position detection module 410. The directions module 418 uses one or more maps stored in a map database 420 to identify routes from the current location of the EV 302 to the destination.

The range module 422 determines the driving range of the EV 302. The range of the EV 302 includes the distance that the EV 302 may travel before it no longer has energy to travel.

Figure 5:
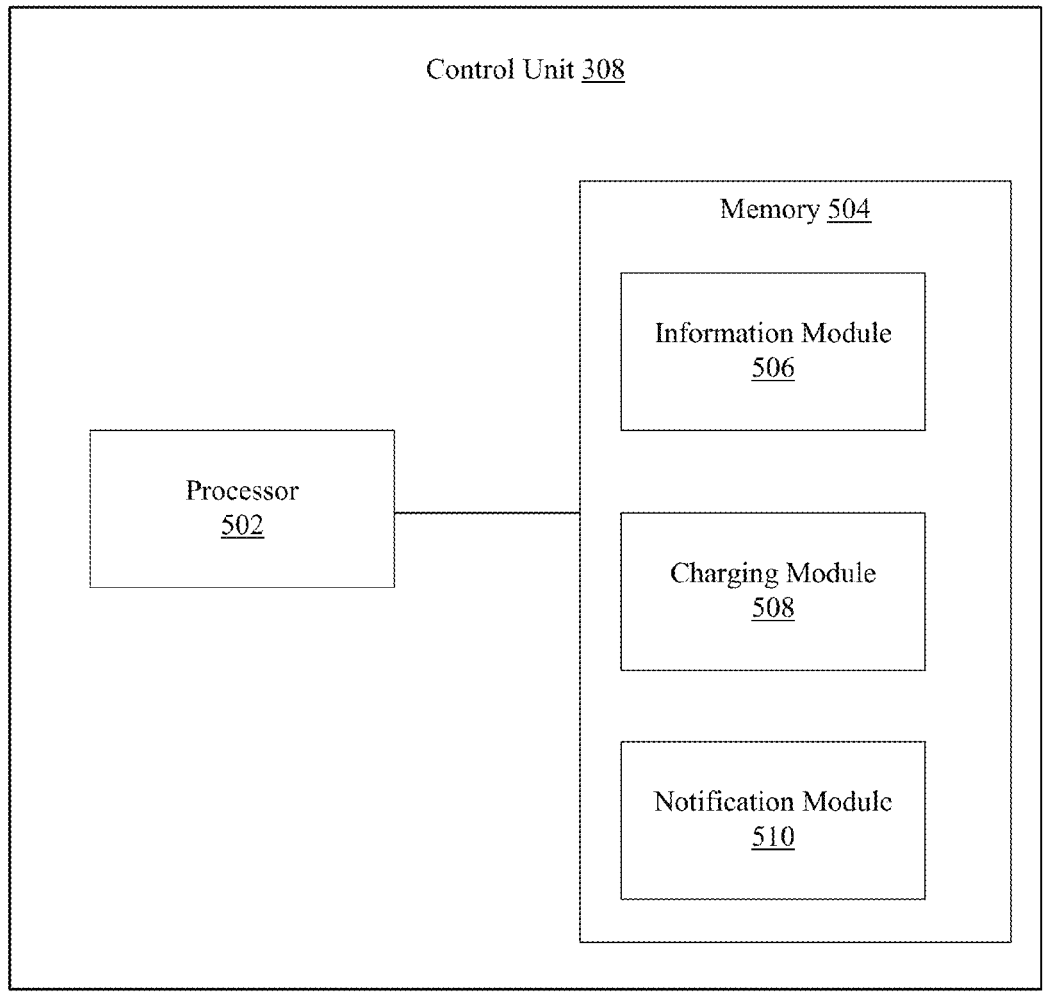
FIG. 5 illustrates a typical charging unit in accordance with one embodiment of the present application.

FIG. 5 illustrates a typical charging unit in accordance with one embodiment of the present application. The control unit 308 includes a processor 502 and a memory 504. In exemplary embodiments, the processor 502 and memory 504 may be functionally equivalent to the processor 402 and memory 412 of the telematics-navigation device 306. The memory 504 may include an information module 506, a charging module 508, and a notification module 510.

The information module 506 provides charging information to the tracking server 312. In exemplary embodiments, when the EV 302 is connected to a charging station and charging, the information module 506 periodically (e.g., every 15 minutes) transmits charging information to the tracking server 302. In exemplary embodiments, the information module 506 transmits charging information to the tracking server 312 when the EV 302 starts charging and when the charging stops. The charging information transmitted to the tracking server 312 by the information module 506 includes one or more of the following: the current time, time when charging started, time when charging stopped, the current geographic location of the EV 302, a VIN of the EV 302, information about the owner of the E.V. (e.g., owner's identifier, name or address), information about the charging station (e.g., voltage at the charging station), the current flow, the current state of charge of the EV 302, combination thereof, or the like.

Charging module 508 manages the charging of the EV 302. When the EV 302 is connected to a charging station for charging, the charging module 508 determines a strategy for charging the EV 302 based at least on a charging mode selected by a user through the telematics-navigation device 306.

When charge now mode is selected, the strategy determined by the charging module 508 for charging the EV 302 includes the charging module 508 immediately initiating the charging of the EV 302. In exemplary embodiments, to initiate the charging, the charging module 508 simply allows electric energy from the charging station to flow to the EV 302. In exemplary embodiments, the charging cable includes a data connection to the charging station and to initiate charging, the charging module 508 sends a signal to the charging station for it to start transmitting electric energy. Similarly, to stop charging of the EV 302, the charging module 508 signals the station to stop the transmission of electric energy. Once charging is initiated, the charging module 508 allows the EV 302 to continue charging until the EV 302 is fully charged. The charging module 508 maintains the EV 302 fully charged until the EV 302 is disconnected from the charging station.

When timer mode is selected, the strategy determined by the charging module 508 for charging the EV 302 identifies a set time associated with the timer mode and provided to the telematics-navigation device 506. The charging module 508 tracks the current time. At the set time, the charging module 508 initiates charging of the EV 302. In exemplary embodiments, the charging module 508 allows the EV 302 to continue charging until the EV 302 is fully charged. In some embodiments, when a stop time is provided by the user to the telematics-navigation device 306, the charging module 508 allows the EV 302 to charge until the stop time is reached or the EV 302 is fully charged, whichever occurs first.

If economical mode was selected, the strategy determined by the charging module 508 for charging the EV 302 includes the charging module 508 determining whether the current state of charge of the EV 302 is less than a minimum state of charge. If the current state of charge is below the minimum state of charge, the charging module 508 initiates the charging of the EV 302 regardless of the current cost of electric energy. The charging module 508 halts the charging of the EV 302 once the state of charge of the EV 302 reaches the minimum state of charge. The minimum state of charge is an amount that is less than the EV 302 being fully charged.

The charging module 508 determines a time for reinitiating the charging based on the latest cost information obtained by telematics-navigation device 306 from the utility server 314. The charging module 508 determines to reinitiate charging at the closest time when the cost of electric energy is economical. The charging module 508 reinitiates charging of the EV 302 at the determined time. The charging module 508 allows the charging of the EV 302 to continue as long as the electric energy being transmitted by the charging station is economical and until the EV 302 is fully charged.

In exemplary embodiments, if the charging module 508 receives charging instructions from the tracking server 312, instead of charging according to the strategy determined by the charging module 508, the charging module 508 charges the EV 302 according to the instructions received from the tracking server 312. In other words, the instructions received from the tracking server 312 may override the strategy determined by the charging module 508 for charging the EV 302.

The notification module 510 transmits messages to a user of the EV 302. In exemplary embodiments, when the charging module 508 receives instructions for charging the EV 302 from the tracking server 312, the notification module 510 sends a message with information as to how the EV 302 will be charged according to the instructions. For example, if instructions received from the tracking server 312 indicate to delay charging for two hours, the notification module 510 sends a message to the user that states that charging of the EV 302 will be delayed by two hours. Based on information received from the tracking server 312, the notification module 510 additionally includes in the message an explanation of why the EV 302 is being charged according to instructions from the tracking server 312. For example, the explanation may be that the excess capacity of the EV will be used to store excess electric energy. In exemplary embodiments, the notification module 510 transmits messages to the user when one or more of the following occurs: when the charging module 508 initiates the charging of the EV 302, when charging of the EV is stopped, and when the EV 302 has reached full charge.

In exemplary embodiments, messages are transmitted by the notification module 510 to the user's mobile device as short message service (SMS) messages or multimedia messaging service (MMS) messages. In exemplary embodiments, messages are transmitted by notification module 510 to the user's mobile device and appear on the mobile device as part of a mobile application that provides information about the EV 302. In another embodiment, messages are transmitted to the user's email address as emails.

Figure 6:
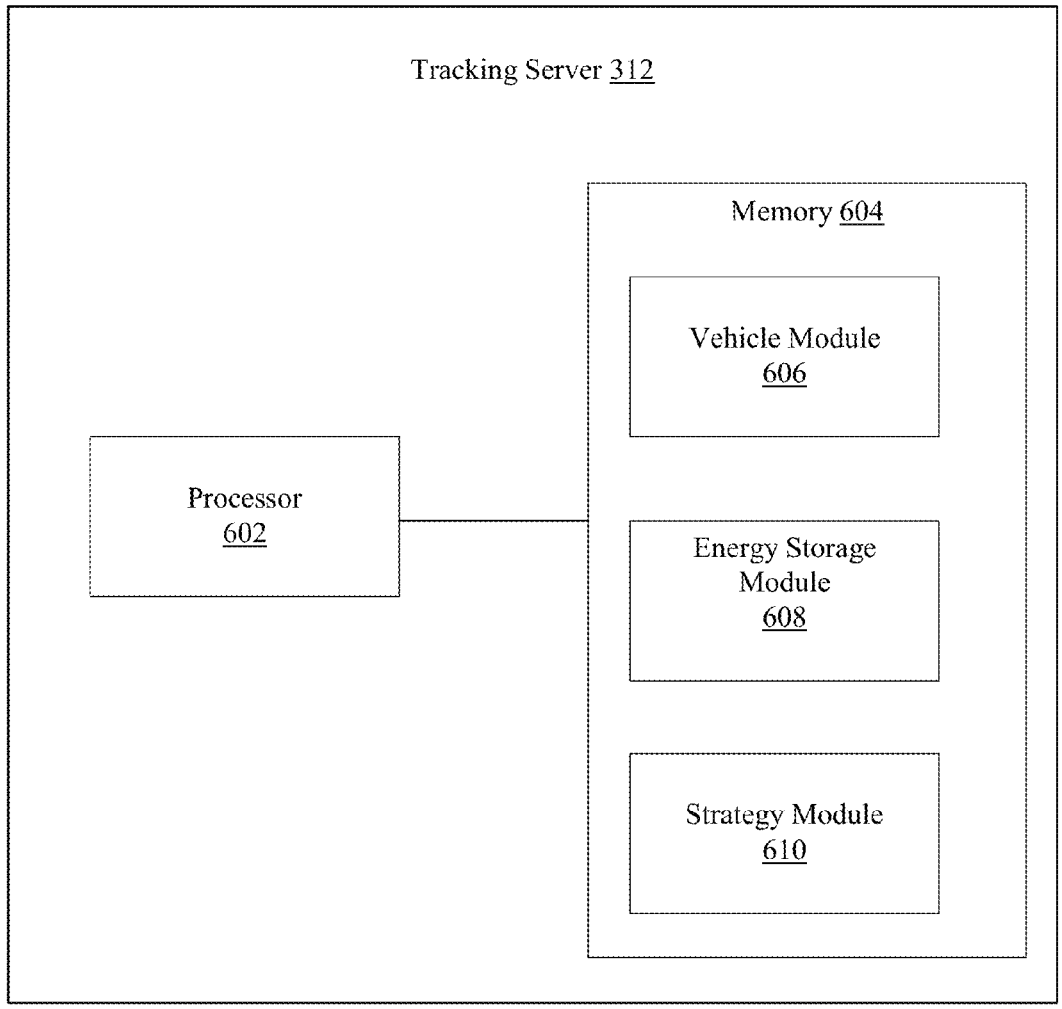
FIG. 6 illustrates a typical tracking server in accordance with one embodiment of the present application.

FIG. 6 illustrates a typical tracking server in accordance with one embodiment of the present application. The tracker server 314 includes a processor 602 and a memory 604. In exemplary embodiments, the processor 602 and memory 604 are functionally equivalent to the processor 402 and memory 412 of the telematics-navigation device 306. The memory 604 stores a vehicle module 606, an energy Storage module 608, and a strategy module 610.

The vehicle module 606 tracks EVs charging in different sectors. The vehicle module 606 maintains a list of EVs charging in each sector. When an EV transmits charging information that indicates that the EV is charging, the vehicle module 606 identifies from the charging information a current geographical location of the EV and a sector associated with the EV's geographical location. The vehicle module 606 determines whether the EV is included in the list. If the EV is not included, the vehicle module 606 adds the EV to the list (e.g., the VIN of the EV) under the identified sector along with charging information received. If the EV is already included in the list, the vehicle module 606 updates charging information included in the list for the EV based on the last information received. For example, if the current state of charge of the EV is 70% and the list indicates that it is 30%, the vehicle module 606 will update the list to indicate that it is 70%.

When an EV transmits charging information that indicates that the charging of the EV has stopped, the vehicle module 606 identifies the sector associated with the EV's current location. The vehicle module 606 removes the EV under the identified sector from the list.

The energy storage module 608 tracks electric energy storage capacity for sectors. For each sector, the energy storage module 608 periodically requests and receives (e.g., every 30 minutes) from the utility server 314 the current total electric energy storage needs of the sector. The energy storage module 608 tracks the current electric energy excess generation of each of the sectors based on the information received from utility server 314.

The strategy module 610 when necessary controls the charging of EVs to provide electric energy storage capacity for sectors. When the total electric energy storage capacity of a sector, as tracked by the energy storage module 608, is greater than a threshold, the strategy module 610 obtains from the vehicle module 606 information on EVs charging in the sector. The strategy module 610 determines a strategy for efficiently charging the EVs in the sector in a way that will permit storage of electric energy in the EVs in the sector.

In exemplary embodiments, the strategy determined by the strategy module 610 is to reduce the rate at which electric energy is being shed or stored in one or more of the EVs in the sector by their respective charging stations. In exemplary embodiments, the strategy is to stagger the storing of the electric charge in EVs in the sector so that the EVs stay below the maximum SOC set for the EV. Under this embodiment, the strategy consists of the strategy module 610 determining a schedule for each EV in the sector that is charging. The schedule indicates when the EV is to charge and for how long. In exemplary embodiments, the EVs with higher range of operational windows of charge get the earlier charging times and are allowed to store electric energy for longer periods, whereas the EVs that with smaller or narrower operational windows of charge get the later times. In exemplary embodiments, a strategy determined by the strategy module 610 that is more drastic is to store electric charge in all the EVs in the sector.

The strategy module 610 transmits instructions for charging to the appropriate EVs in the sector based on the determined strategy. The instructions describe to an EV how the EV should be charged. The transmitted instructions allow the EVs to execute the strategy determined by the strategy module 610. In exemplary embodiments, the strategy module 610 transmits with the instructions information as to why the strategy is being put into effect (e.g., because current electric energy consumption is less than current electric generation availability).

In exemplary embodiments, the threshold for each sector varies. For example, for one sector the threshold may be electricity generation that exceeds electricity consumption by 5%, 10%, 15%, 20% or greater. In exemplary embodiments, there may be multiple thresholds for each sector and the strategy determined by the strategy module 610 depends on which threshold is surpassed. For example, if the threshold surpassed is 5% of a sectors maximum capacity, the strategy module 610 staggers the storing of charge in the EVs in the sector. However, if the threshold surpassed is 15%, the strategy module 610 stores charge in all EVs in the sector. In exemplary embodiments, the one or more thresholds of a sector are set by a utility company that provides electric energy to the sector.

Figure 7:
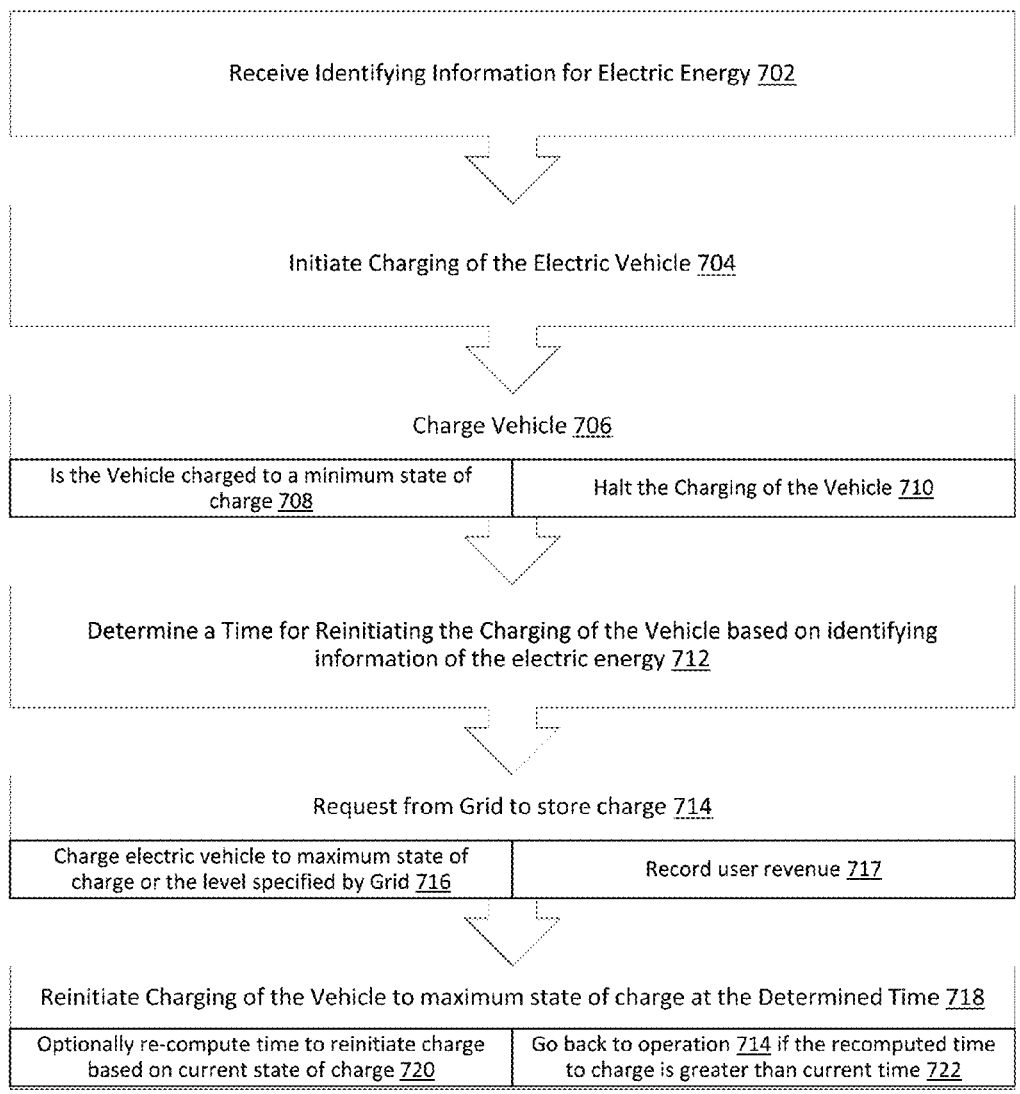
FIG. 7 illustrates a flowchart for a typical EV charging method in accordance with one embodiment of the present application.

FIG. 7 illustrates a flowchart for a typical EV charging method in accordance with one embodiment of the present application. Method 700 may be performed by the charging system 304 for charging the EV 302. In exemplary embodiments, the steps of the method are implemented by the processors of the telematics-navigation device 306 and the control unit 308 executing instructions that cause the desired actions. Those of skill in the art will recognize that one or more of the method steps may be implemented in embodiments of hardware and/or software or combinations thereof. For example, instructions for performing the described actions are embodied or stored within a non-transitory computer readable medium. Furthermore, those of skill in the art will recognize that other embodiments may perform the steps of FIG. 7 in different orders. Moreover, other embodiments may include different and/or additional steps than the ones described here.

When an EV is connected to a charging station and the charging of an EV is initiated using a charging method 700, identifying information for electric energy is received at operation 702. The identifying information of the electric energy may include a SOC of the EV, a minimum SOC level for the EV, a maximum SOC level for the EV, an operational window, a threshold, a utility rate, a forecasted time of use for the EV, electricity supply information, electricity demand information, information for electric energy supplied to the charging station and the like. The identifying information of the electric energy may be provided by EV. In exemplary embodiments, one or more parameters included in the identifying information of the electric energy may be supplied by a grid operator, for example, by a utility server. In exemplary embodiments, one or more parameters included in the identifying information of the electric energy may be supplied be an aggregator, in other words, a commercial charging station used to energize multiple electric vehicles at one time.

The minimum level of SOC may be set be to range between 20% of a vehicle maximum capacity charge level to 90% of, for example, 20% or greater, 25% or greater, 30% or greater, 35% or greater, 40% or greater, 45% or greater, 45% or greater, 50% or greater, 55% or greater, 60% or greater, 65% or greater, 70% or greater, 75% or greater, 80% or greater, 85% or greater, or the like.

The maximum level of SOC may be set be to range between 50% of a vehicle maximum capacity charge level to 90% of a vehicle maximum capacity charge level, for example, 50% or greater, 55% or greater, 60% or greater, 65% or greater, 70% or greater, 75% or greater, 80% or greater, 85% or greater, 90% or greater, 95% or greater, or the like.

The float, e.g., the operational window between a minimum level of SOC and a threshold of SOC, may provide for storing a charge on behalf of the grid. The operational window may range from 10% of a vehicle maximum capacity charge level to 70% of a vehicle maximum capacity charge level, for example, 10% or greater, 15% or greater, 20% or greater, 25% or greater, 30% or greater, 35% or greater, 40% or greater, 45% or greater, 45% or greater, 50% or greater, 55% or greater, 60% or greater, 65% or greater, 70% or greater, or the like.

In exemplary embodiments, the charger may initiate charging of the electric vehicle at operation 704 to, for example, ensure that the EV SOC exceeds a minimum state of charge.

In exemplary embodiments, the method 700 may monitor the charge vehicle operation 706. When the monitoring determines that the EV has been charged to a minimum state of charge at operation 708, a halt of the charging of the EV at operation 710 is performed.

In exemplary embodiments, after operation 710 method 700 may calculate or receive a determination of a time to reinitiate the charging of the vehicle based on the identifying information of the electric energy at operation 712.

In exemplary embodiments, the determination of a time to reinitiate the charging of the vehicle based on the identifying information of the electric energy at operation 712 may further include notifying the grid that the EV is available to store grid energy at least until it is time to reinitiate the charging of the EV. In exemplary embodiments, the determination of a time to reinitiate the charging of the vehicle based on identifying information for the electric energy at operation 712 may further include notifying the grid that the EV is available to store grid energy at most until a forecasted time of use for the EV.

In exemplary embodiments, method 700 may include receiving a request from a grid or an aggregator to store charge at operation 714. As such, method 700 may include charging electric vehicles to the maximum state of charge or a SOC level specified by the grid at operation 716.

Method 700 may include recording user revenue at operation 717. The revenue may be based on the duration of the storage of the charge and a maximum charge level of the EV based on a grid request to store energy. The user revenue may be computed or received. The user revenue may be recorded with the identifying information of the electric energy.

In exemplary embodiments, method 700 may include reinitiate charging of the vehicle at operation 718. In some embodiments, method 700 may re-determine or re-compute a time to reinitiate charge based on current state of charge 720. When the recomputed time to charge is greater than a current time, method 700 may make the EV available for storing energy to the grid per operation 714.

Assume for purposes of this example that the EV 302 is connected to a charging station. The charging system 304 identifies information for electric energy supplied to the charging station. The information is provided to the charging system 304 by the utility server 314. The charging system 304 initiates 704 charging of the EV 302 regardless of the current cost of the electric energy.

The charging system 304 allows the EV 302 to continue charging 706 until the state of charge of the EV 302 reaches a minimum state of charge. The charging system 304 halts 708 the charging of the EV 302 once the state of charge of the EV 302 reaches the minimum state of charge. The charging system 304 determines 712 a time for reinitiating charging of the EV 302 based on the information. The charging system 304 reinitiates 718 charging of the EV 302 at the determined time.

Figure 8:
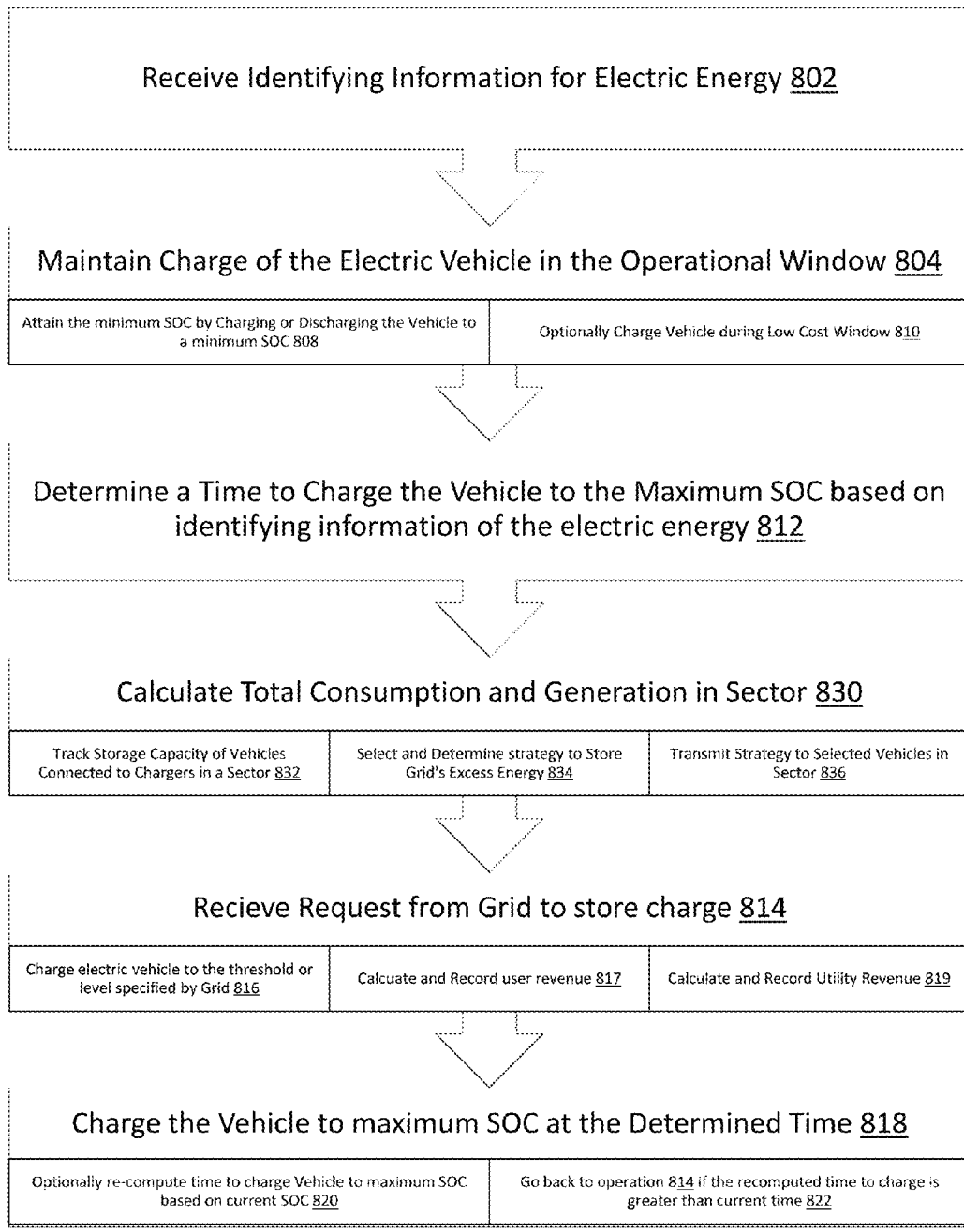
FIG. 8 illustrates a flowchart for a typical EV charging method in accordance with one embodiment of the present application.

FIG. 8 illustrates a flowchart for a typical EV charging method in accordance with one embodiment of the present application. Method 800 may be performed by the charging system 304 for charging the EV 302. In exemplary embodiments, the steps of the method are implemented by the processors of the telematics-navigation device 306 and the control unit 308 executing instructions that cause the desired actions. Those of skill in the art will recognize that one or more of the method steps may be implemented in embodiments of hardware and/or software or combinations thereof. For example, instructions for performing the described actions are embodied or stored within a non-transitory computer readable medium. Furthermore, those of skill in the art will recognize that other embodiments may perform the steps of FIG. 8 in different orders. Moreover, other embodiments may include different and/or additional steps than the ones described here.

When an EV is connected to a charging station using a charging method 800, identifying information for electric energy is received at operation 802. The identifying information of the electric energy may include a SOC of the EV, a minimum SOC level for the EV, a maximum SOC level for the EV, an operational window, a threshold, a utility rate, a forecasted time of use for the EV, electricity supply information, electricity demand information, information for electric energy supplied to the charging station and the like. The identifying information of the electric energy may be provided by EV. In exemplary embodiments, one or more parameters included in the identifying information of the electric energy may be supplied by a grid operator, for example, by a utility server. In exemplary embodiments, one or more parameters included in the identifying information of the electric energy may be supplied be an aggregator, in other words, a commercial charging station used to energize multiple electric vehicles at one time.

The minimum level of SOC may be set be to range between 20% of a vehicle maximum capacity charge level to 90% of, for example, 20% or greater, 25% or greater, 30% or greater, 35% or greater, 40% or greater, 45% or greater, 45% or greater, 50% or greater, 55% or greater, 60% or greater, 65% or greater, 80% or greater, 85% or greater, 80% or greater, 85% or greater, or the like.

The maximum level of SOC may be set be to range between 50% of a vehicle maximum capacity charge level to 90% of a vehicle maximum capacity charge level, for example, 50% or greater, 55% or greater, 60% or greater, 65% or greater, 70% or greater, 75% or greater, 80% or greater, 85% or greater, 90% or greater, 95% or greater, or the like.

The float, e.g., the operational window between a minimum level of SOC and a threshold of SOC, may provide for storing a charge on behalf of the grid. The operational window may range from 10% of a vehicle maximum capacity charge level to 70% of a vehicle maximum capacity charge level, for example, 10% or greater, 15% or greater, 20% or greater, 25% or greater, 30% or greater, 35% or greater, 40% or greater, 45% or greater, 45% or greater, 50% or greater, 55% or greater, 60% or greater, 65% or greater, 70% or greater, or the like.

In exemplary embodiments, the charger may maintain a charge of the electric vehicle at operation 804 to, for example, ensure that the EV SOC is within an operational window. In exemplary embodiments, to attain a charge in the operational window the EV may be allowed to discharge to the minimum SOC, when the current SOC of the EV exceeds a minimum SOC per operation 808. In exemplary embodiments, to attain a charge in the operational window the EV may be charged to the minimum SOC, when the current SOC of the EV is less than the minimum SOC per operation 808. In exemplary embodiments, the maintaining of the charge of the EV that needs to charge the EV above the minimum SOC can be performed during a low cost window in operation 810.

In exemplary embodiments, method 800 may calculate or receive a determination of a time to initiate the charging of the vehicle to the maximum SOC based on the identifying information of the electric energy at operation 812.

In exemplary embodiments, the determination of the time to initiate the charging of the vehicle to the maximum SOC based on the identifying information of the electric energy at operation 812 may further include notifying the grid that the EV is available to store grid energy at least until it is time to initiate the charging of the EV to the maximum SOC. In exemplary embodiments, the determination of a time to initiate the charging of the vehicle at operation 812 may further include notifying the grid that the EV is available to store grid energy until a forecasted time of use for the EV.

In exemplary embodiments, method 800 may include receiving a request from a grid or an aggregator to store charge at operation 814. As such, method 800 may include charging electric vehicles to the threshold or a SOC level specified by the grid at operation 816.

Method 800 may include recording user revenue at operation 817. The revenue may be based on the duration of the storage of the charge and a maximum charge level of the EV based on a grid request to store energy. The user revenue may be computed or received. The user revenue may be recorded with the identifying information of the electric energy.

Method 800 may include recording utility revenue at operation 819. The utility revenue may be based on a discounted cost for the electrical energy stored for the electrical grid's use in the vehicle and which electrical energy was not discharged by the electrical grid prior to the time for initiating the charging to the maximum SOC in the vehicle elapsed.

In exemplary embodiments, method 800 may include initiate charging to the maximum SOC of the vehicle at operation 818. In some embodiments, method 800 may re-determine or re-compute a time to initiate charge vehicle to the maximum SOC based on current state of charge 820. When the recomputed time to charge is greater than a current time, method 800 may make the EV available for storing energy to the grid per operation 814.

If a user selected to charge the EV 302 under V2G mode, the information identified is information that describes the cost of electric energy at different times of a day. Under V2G mode, the time when charging is reinitiated is a time when electric energy is economical or the determined time to charge to maximum SOC has arrived.

Method 800 may include calculating total electricity consumption and generation in a sector in operation 830. Method 800 may include tracking a storage capacity or operational window value of each EV connected to a charger in a sector at operation 832. An EV may be available to store excess grid capacity once the EV has reached the minimum SOC for the vehicle. When operation 830 determines that the electricity generation for the sector exceeds the electric consumption in a sector, operation 834 can select and determine a strategy to store the grid's excess energy for each EV that was tracked as being connected and having a storage capacity in the sector at operation 832.

In operation 836, method 800 includes transmitting the determined strategy for each selected vehicle in the sector in order for the selected vehicles to start storing excess electricity on behalf of the grid.

The above-described embodiments according to the present disclosure may be implemented in the form of a program command that may be executed through various constituent elements of a computer, and the program command may be recorded on a computer-readable recording medium. The above-described computer-readable recording medium may independently include a program command, a data file, a data structure, or the like or may include a combination thereof. The program command recorded on the computer-readable recording medium is designed and configured especially for the present disclosure and may be known to those skilled in the art in the field of computer software to be usable. Examples of the computer-readable recording medium include a magnetic medium such as a hard disk, a floppy disk, or a magnetic tape, an optical recording medium such as a CD-ROM or a DVD, a magneto-optical medium such as a floptical disk, and a hardware device such as a ROM, a RAM, or a flash memory that is especially configured so as to store and execute the program command. Examples of the program command include not only a machine code that is produced by a complier but also a high-level language code that may be executed by a computer using an interpreter or the like. The above-described hardware device may be configured to operate as one or more software modules used for performing the process according to the present disclosure, and the program command may be implemented as one or more hardware devices.

While the exemplary embodiments have been shown and described, it will be understood by those skilled in the art that various changes in form and details may be made thereto without departing from the spirit and scope of the present disclosure as defined by the appended claims.

In addition, many modifications may be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A computer-implemented method for storing electrical charge in an electric vehicle connected to a charging station, the method comprising:
   attaining a minimum State of Charge (SOC) for the electric vehicle;
   determining a time to charge the electric vehicle to a maximum SOC;
   notifying an electrical grid that the electric vehicle is available to store electrical charge for the electrical grid until the determined time;
   maintaining an electric vehicle SOC between the minimum SOC and a threshold SOC until the determined time by repeatedly charging the electric vehicle to the threshold SOC and allowing discharge of the electric vehicle to the minimum SOC until the determined time; and
   charging the electric vehicle to the maximum SOC at the determined time,
   wherein the threshold SOC is greater than the minimum SOC and the maximum SOC is greater than or equal to the threshold SOC.

2. The method of claim 1, wherein the maximum SOC is greater than the threshold SOC.

3. The method of claim 1, wherein the threshold SOC is greater than the minimum SOC by 20% of the SOC.

4. The method of claim 1, comprising receiving, from the electrical grid, cost information for electric energy comprising time of use rates for electric energy rates varying by at least one of time, day, month or calendar season.

5. The method of claim 4, wherein the determining the time to charge the electric vehicle to the maximum SOC comprises:
   calculating a time to charge the electric vehicle that at least partially overlaps off peak-hours for electric energy rates.

6. The method of claim 1, wherein the maintaining the electrical vehicle SOC between the minimum SOC and the threshold SOC until the determined time comprises:

storing the electrical charge for the electrical grid in the electric vehicle by charging the electric vehicle to a SOC that is less than or equal to the threshold SOC, wherein the storing is provided until a current time is greater than or equal to the determined time to charge the electric vehicle to the maximum SOC.

7. The method of claim 6, comprising calculating and recording a user revenue associated with the storing of electrical charge for the electrical grid in the electric vehicle.

8. The method of claim 1, wherein the maintaining the electrical vehicle SOC between the minimum SOC and the threshold SOC until the determined time comprises:
supplying electrical energy to the electrical grid by discharging the electric vehicle while the electric vehicle SOC is greater than the minimum SOC and a current time is less than the determined time to charge the electric vehicle to the maximum SOC.

9. The method of claim 8, comprising calculating and recording a user revenue for the supplying of the electrical energy to the electrical grid by discharging the electric vehicle.

10. The method of claim 1, wherein the determining the time to charge the electric vehicle to the maximum SOC comprises, after a current time is greater than or equal to the determined time to charge the electric vehicle to the maximum SOC, re-determining the time to charge the electric vehicle to the maximum SOC based on the electric vehicle SOC.

11. The method of claim 1, wherein the minimum SOC, the threshold SOC, and the maximum SOC are set by one or more of a user of the electric vehicle, a manufacturer of the electric vehicle, or an aggregate charging entity.

12. The method of claim 1, wherein the maximum SOC is greater than the threshold SOC and the threshold SOC is greater than the minimum SOC by 10% of the SOC.

13. A vehicle system for storing electrical charge in an electric vehicle connected to a charging station, the vehicle system comprising:
a telematics-navigation device configured to identify information of electric energy provided by the charging station; and
a control unit configured to:
attain a minimum State of Charge (SOC) for the electric vehicle;
determine a time to charge the electric vehicle to a maximum SOC;
notify an electrical grid that the electric vehicle is available to store electrical charge for the electrical grid until the determined time;
maintain an electric vehicle SOC between the minimum SOC and a threshold SOC until the determined time by repeatedly charging the electric vehicle to the threshold SOC and allowing discharge of the electric vehicle to the minimum SOC until the determined time; and
charge the electric vehicle to the maximum SOC at the determined time,
wherein the threshold SOC is greater than the minimum SOC and the maximum SOC is greater than or equal to the threshold SOC.

14. The system of claim 13, wherein the threshold SOC is greater than the minimum SOC by 20% of the SOC.

15. The system of claim 13, wherein the control unit receives, from an electrical grid, cost information for electric energy comprising time of use rates for electric energy rates varying by at least one of time, day, month or calendar season.

16. The system of claim 15, wherein to determine the time to charge the electric vehicle to the maximum SOC, the control unit calculates a time to charge the electric vehicle that at least partially overlaps off peak-hours for electric energy rates.

17. The system of claim 13, wherein to maintain the electrical vehicle SOC between the minimum SOC and the threshold SOC until the determined time, the control unit stores the electrical charge for the electrical grid in the electric vehicle by charging the electric vehicle to a SOC that is less than or equal to the threshold SOC, wherein the store is provided until a current time is greater than or equal to the determined time to charge the electric vehicle to the maximum SOC.

18. The system of claim 17, wherein the control unit calculates and records a user revenue associated with the storing of electrical charge for the electrical grid in the electric vehicle.

19. The system of claim 13, wherein to maintain the electrical vehicle SOC between the minimum SOC and the threshold SOC until the determined time, the control unit supplies electrical energy to the electrical grid by discharging the electric vehicle while the electric vehicle SOC is greater than the minimum SOC and a current time is less than the determined time to charge the electric vehicle to the maximum SOC.

20. The system of claim 13, wherein the maximum SOC is greater than the threshold SOC and the threshold SOC is greater than the minimum SOC by 10% of the SOC.

* * * * *